(12) United States Patent
Guidi et al.

(10) Patent No.: US 9,046,178 B2
(45) Date of Patent: Jun. 2, 2015

(54) SELF-RETAINING GASKET AND FASTENER RETAINER

(71) Applicants: DENSO International America, Inc., Southfield, MI (US); DENSO CORPORATION, Kariya-shi, Aichi-ken (JP)

(72) Inventors: Paolo Guidi, Macomb, MI (US); Robert Cardno, Novi, MI (US); Kyle Mark Renno, Port Huron, MI (US)

(73) Assignees: DENSO International America, Inc., Southfield, MI (US); DENSO CORPORATION, Kariya-shi, Aichi-ken (JP)

( * ) Notice: Subject to any disclaimer, the term of this patent is extended or adjusted under 35 U.S.C. 154(b) by 0 days.

(21) Appl. No.: 13/790,502

(22) Filed: Mar. 8, 2013

(65) Prior Publication Data

US 2014/0252723 A1  Sep. 11, 2014

(51) Int. Cl.
*F16J 15/06* (2006.01)

(52) U.S. Cl.
CPC .................................. *F16J 15/061* (2013.01)

(58) Field of Classification Search
CPC ........................................................ F16J 15/061
USPC .......................... 277/598, 616, 630, 637, 640
See application file for complete search history.

(56) References Cited

U.S. PATENT DOCUMENTS

| | | | | |
|---|---|---|---|---|
| 350,020 A * | 9/1886 | Shipman | .......................... | 24/627 |
| 922,132 A * | 5/1909 | Gold | ............................. | 285/380 |
| 1,681,729 A * | 8/1928 | Gold et al. | ..................... | 285/76 |
| RE24,065 E * | 10/1955 | Bergstrom | ...................... | 403/14 |
| 3,080,171 A * | 3/1963 | Booth | ............................ | 277/622 |
| 4,402,118 A * | 9/1983 | Benedetti | ........................ | 24/289 |
| 4,756,561 A * | 7/1988 | Kawata et al. | ................ | 285/187 |
| 5,203,576 A * | 4/1993 | Miyaoh et al. | ................ | 277/598 |
| 5,269,540 A * | 12/1993 | Nobuchi et al. | ............... | 277/591 |
| 5,340,170 A * | 8/1994 | Shinohara et al. | ............ | 285/379 |
| 5,366,261 A * | 11/1994 | Ohmi et al. | .................... | 285/328 |
| 5,544,902 A * | 8/1996 | Belter | ............................ | 277/630 |
| 5,645,282 A * | 7/1997 | Belter | ............................ | 277/598 |
| 5,673,920 A * | 10/1997 | Mockenhaupt | ............... | 277/630 |
| 5,791,660 A * | 8/1998 | Belter | ............................ | 277/598 |
| 5,926,921 A * | 7/1999 | Benoit | ........................ | 24/16 PB |
| 6,119,316 A * | 9/2000 | Ishihara et al. | .................. | 24/297 |
| 6,142,539 A * | 11/2000 | Redemann et al. | ............ | 285/379 |
| 6,367,802 B1 * | 4/2002 | Knapp | ........................... | 277/314 |
| 6,474,700 B2 * | 11/2002 | Redemann et al. | ............ | 285/379 |
| 6,708,979 B2 * | 3/2004 | Stratman et al. | ............... | 277/316 |
| 6,893,024 B2 * | 5/2005 | Belter | ............................ | 277/598 |
| 7,204,000 B2 * | 4/2007 | Benedetti et al. | ............... | 24/295 |
| 7,234,209 B2 * | 6/2007 | Totani et al. | ..................... | 24/607 |
| 7,320,157 B2 * | 1/2008 | Lubera et al. | ................... | 24/295 |
| 2004/0021271 A1 * | 2/2004 | Tratnik | ........................ | 277/616 |
| 2008/0226419 A1 * | 9/2008 | Holt et al. | ...................... | 411/347 |
| 2013/0277921 A1 * | 10/2013 | Kozlowski et al. | ........... | 277/637 |

* cited by examiner

*Primary Examiner* — Vishal Patel
*Assistant Examiner* — L. Susmitha Koneru
(74) *Attorney, Agent, or Firm* — Harness, Dickey & Pierce, P.L.C.

(57) ABSTRACT

A gasket including a main body, a first retention tab, a second retention tab, and a third retention tab. The main body defines a first aperture. The first, second, and third retention tabs extend from the main body at the first aperture.

19 Claims, 3 Drawing Sheets

US 9,046,178 B2

SELF-RETAINING GASKET AND FASTENER RETAINER

FIELD

The present disclosure relates to a self-retaining gasket and fastener retainer.

BACKGROUND

This section provides background information related to the present disclosure, which is not necessarily prior art.

A gasket is a mechanical seal typically positioned at an interface or joint between two joined objects on a mating surface of one or both of the objects. The gasket provides a seal between the objects to prevent leakage of fluid or other material into or out of the objects. The gasket is typically positioned between the two objects by an assembler, which results in an additional assembly step that increases production time and cost. It would thus be desirable for the gasket to be prepositioned on the mating surface prior to joinder of the two objects during assembly. It would also be desirable for the gasket to retain a fastener to the object.

SUMMARY

This section provides a general summary of the disclosure, and is not a comprehensive disclosure of its full scope or all of its features.

The present teachings provide for a gasket including a main body, a first retention tab, a second retention tab, and a third retention tab. The main body defines a first aperture. The first retention tab extends from the main body at the first aperture. The second retention tab extends from the main body at the first aperture. The third retention tab extends from the main body at the first aperture.

The present teachings further provide for a gasket that includes a main body defining a first aperture. A first retention tab extends from the main body at a first portion of the first aperture. A second retention tab extends from the main body at a second portion of the first aperture opposite to the first portion. A third retention tab extends from the main body at the second portion of the first aperture. The third retention tab is spaced apart from the second retention tab to define a gap therebetween. The first retention tab is opposite to the gap.

The present teachings also provide for a gasket that includes a main body defining a first aperture. A first retention tab, a second retention tab, and a third retention tab each extend from the main body at the first aperture. Each of the retention tabs include a first portion extending from the main body at an acute angle relative to a plane extending parallel to the main body. The first portion of the first retention tab extends towards the first portion of both the second and third retention tabs. The first portion of the second and third retention tabs extends towards the first portion of the first retention tab. The second portion extends from, and in a direction opposite to, the first portion of each of the first retention tab, the second retention tab, and the third retention tab. An elbow portion is defined where each first portion and second portion meet.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
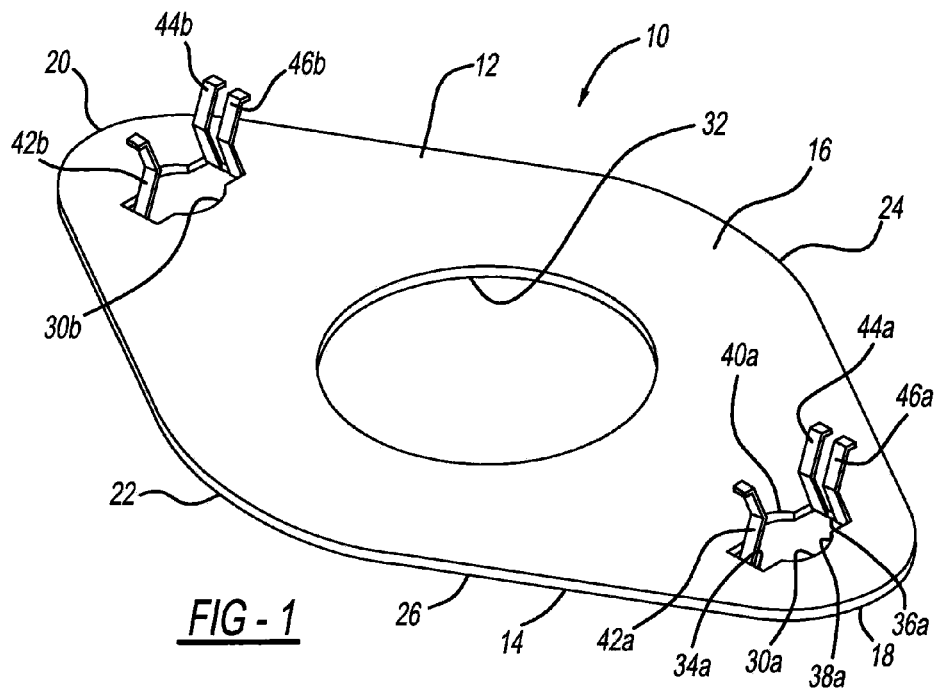
FIG. 1 is a perspective view of an undersurface of a gasket according to the present teachings.
Figure 2:
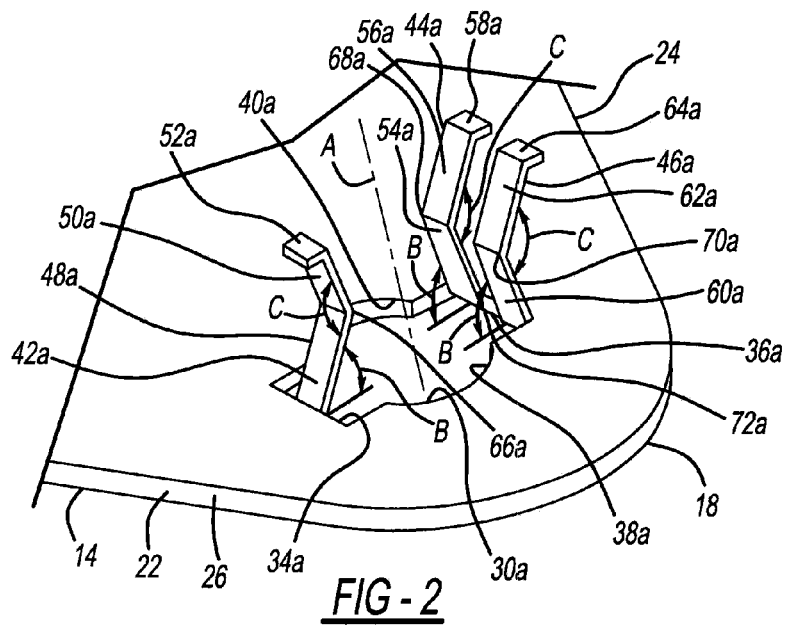
FIG. 2 is a close-up view of retention tabs at a first end of the gasket of FIG. 1.
Figure 3:
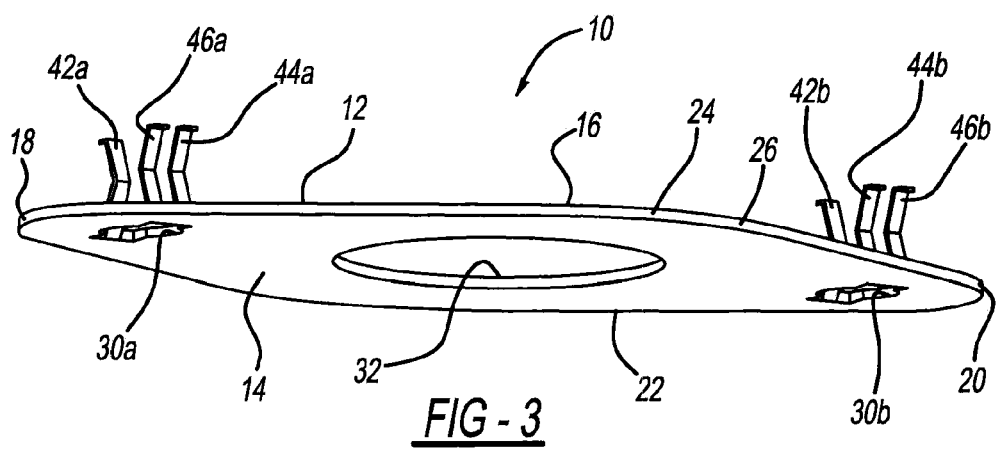
FIG. 3 is a perspective view of the gasket of FIG. 1 showing an undersurface thereof.

With initial reference to FIGS. 1-3, a gasket according to the present teachings is illustrated at reference numeral 10. The gasket 10 includes a main body 12, which has a first, outer, or upper surface 14 (see FIG. 3 for example) and a second, inner, or under surface 16. The first and second surfaces 14 and 16 are each generally planar, and extend in parallel, spaced apart planes. The main body 12 includes a first end 18 and a second end 20, which is opposite to the first end 18. Between the first end 18 and the second end 20 is a first side surface 22 and a second side surface 24, which is opposite to the first side surface 22. The first and second side surfaces 22 and 24 extend between the first end 18 and the second end 20. An outer perimeter surface 26 extends about the main body 12 between the first and second surfaces 14 and 16 and defines an outer edge of the main body 12. The outer perimeter surface 26 is without any fastening elements.

The main body 12 defines a first aperture 30a, a second aperture 30b, and a third aperture 32. The first aperture 30a is proximate to the first end 18, the second aperture 30b is proximate to the second end 20, and the third aperture 32 is between the first aperture 30a and the second aperture 30b. Each of the first, second and third apertures 30a, 30b, and 32, extend through the main body 12 between the first and second surfaces 14 and 16.

The first aperture 30a includes a first side or portion 34a and a second side or portion 36a. The first side 34a is proximate to the first side surface 22, and is opposite to the second side 36a, which is proximate to the second side surface 24. Between the first side 34a and the second side 36a, the first aperture 30a defines a first concave surface 38a and a second concave surface 40a.

At the first aperture 30a is a first tab 42a, a second tab 44a, and a third tab 46a. Each of the first, second, and third tabs 42a, 44a, and 46a extend from the main body 12 at the second surface 16, and extend beyond the second surface 16. The first tab 42a extends from the second surface 16 at the first side 34a of the first aperture 30a. The second and third tabs 44a and 46a extend from the second surface 16 at the second side 36a of the first aperture 30a.

With reference to FIG. 2 for example, the first tab 42a includes a first portion 48a, a second portion 50a, and a third portion 52a. The first portion 48a extends from the first side 34a toward a longitudinal axis A extending through the first aperture 30a and perpendicular to a plane that extends parallel to and across the second surface 16 of the main body 12. The first tab 42a extends from the first side 34a at an acute angle B relative to the plane extending across the second surface 16. The angle B can be any suitable angle less than 90 degrees. The second portion 50a extends from the first portion 48a at an angle C relative to the first portion 48a. The angle C can be any suitable angle, such as any suitable angle less than 180 degrees, for example. The third portion 52a extends from the second portion 50a, and extends generally parallel to the plane extending across the second surface 16 of the main body 12.

The second tab 44a and the third tab 46a are generally similar to the first tab 42a. Therefore, the second tab 44a includes a first portion 54a, a second portion 56a, and a third portion 58a, which are respectively similar to the first portion 48a, the second portion 50a, and the third portion 52a of the first tab 42a. A third tab 46a includes a first portion 60a, a second portion 62a, and a third portion 64a, which are respectively similar to the first portion 48a, the second portion 50a, and the third portion 52a of the first tab 42a. The first portion 60a, the second portion 62a, and the third portion 64a are also respectively similar to the first portion 54a, the second portion 56a, and the third portion 58a of the second tab 44a. The second and third tabs 44a and 46a differ from the first tab 42a with respect to their orientation. The second and third tabs 44a and 46a extend from the second side 36a of the first aperture 30a, and thus the first portions 54a and 60a extend from the second side 36a towards the longitudinal axis A. The second portions 56a and 62a extend away from the longitudinal axis A.

The first tab 42a includes a first elbow 66a between the first portion 48a and the second portion 50a thereof. The second tab 44a includes a second elbow 68a between the first and second portions 54a and 56a thereof. The third tab 46a includes a third elbow 70a between the first and second portions 60a and 62a thereof. The first elbow 66a is the portion of the first tab 42a closest to the longitudinal axis A, which extends through the center of the first aperture 30a. Similarly, the second elbow 68a and the third elbow 70a are the portions of the second tab 44a and the third tab 46a respectively that extend furthest towards the longitudinal axis A. As explained further herein, the first, second, and third elbows 66a, 68a, and 70a each provide a fastener retention surface for retaining a fastener between the first, second and third tabs 42a, 44a, and 46a.

The second tab 44a and the third tab 46a are spaced apart at the second side 36a to define a gap 72 therebetween. The first tab 42a is arranged at the first side 34a opposite to the gap 72. The first, second, and third tabs 42a, 44a, and 46a can be arranged at any other suitable orientation about the first aperture 30a in order to securely retain a fastener within the first aperture 30a and/or to the gasket 10.

At the second aperture 30b, the gasket 10 includes a first tab 42b, a second tab 44b, and a third tab 46b. The first, second, and third tabs 42b, 44b, and 46b are respectively similar to the first, second, and third tabs 42a, 44a, and 46a. Therefore, the description of the first, second, and third tabs 42a, 44a, and 46a also applies to the first, second, and third tabs 42b, 44b, and 46b. The features of the first, second, and third tabs 42b, 44b, and 46b are illustrated with the same reference numbers used for the first, second, and third tabs 42a, 44a, and 46a, but include the letter "b" instead of the letter "a."

Figure 4:
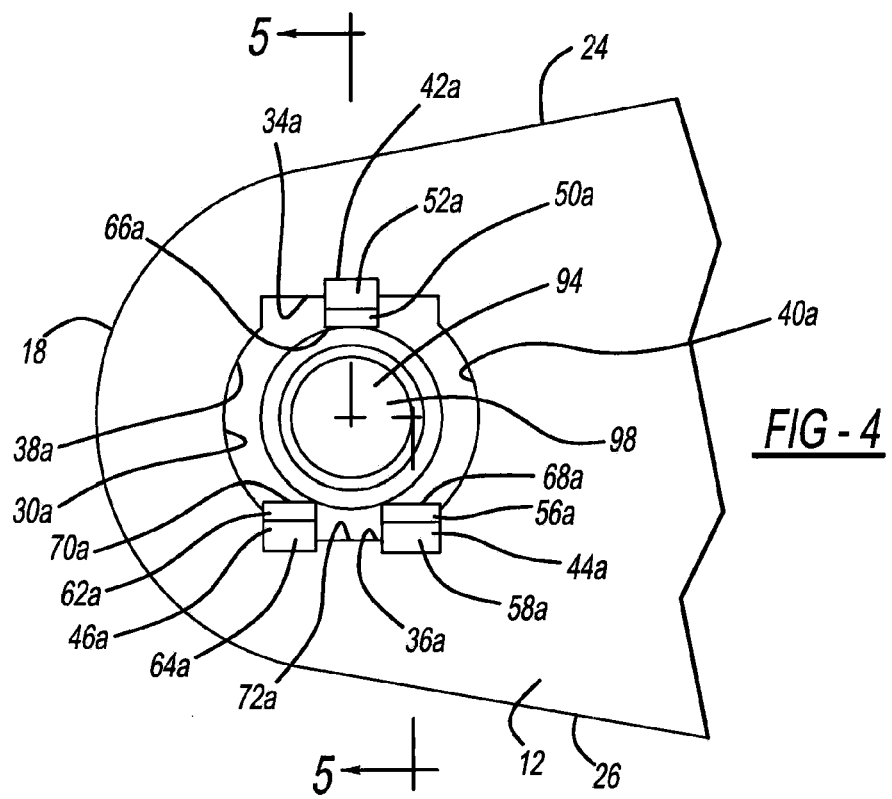
FIG. 4 is a plan view of the undersurface of the gasket of FIG. 1 showing cooperation between the retention tabs and a fastener.
Figure 5:
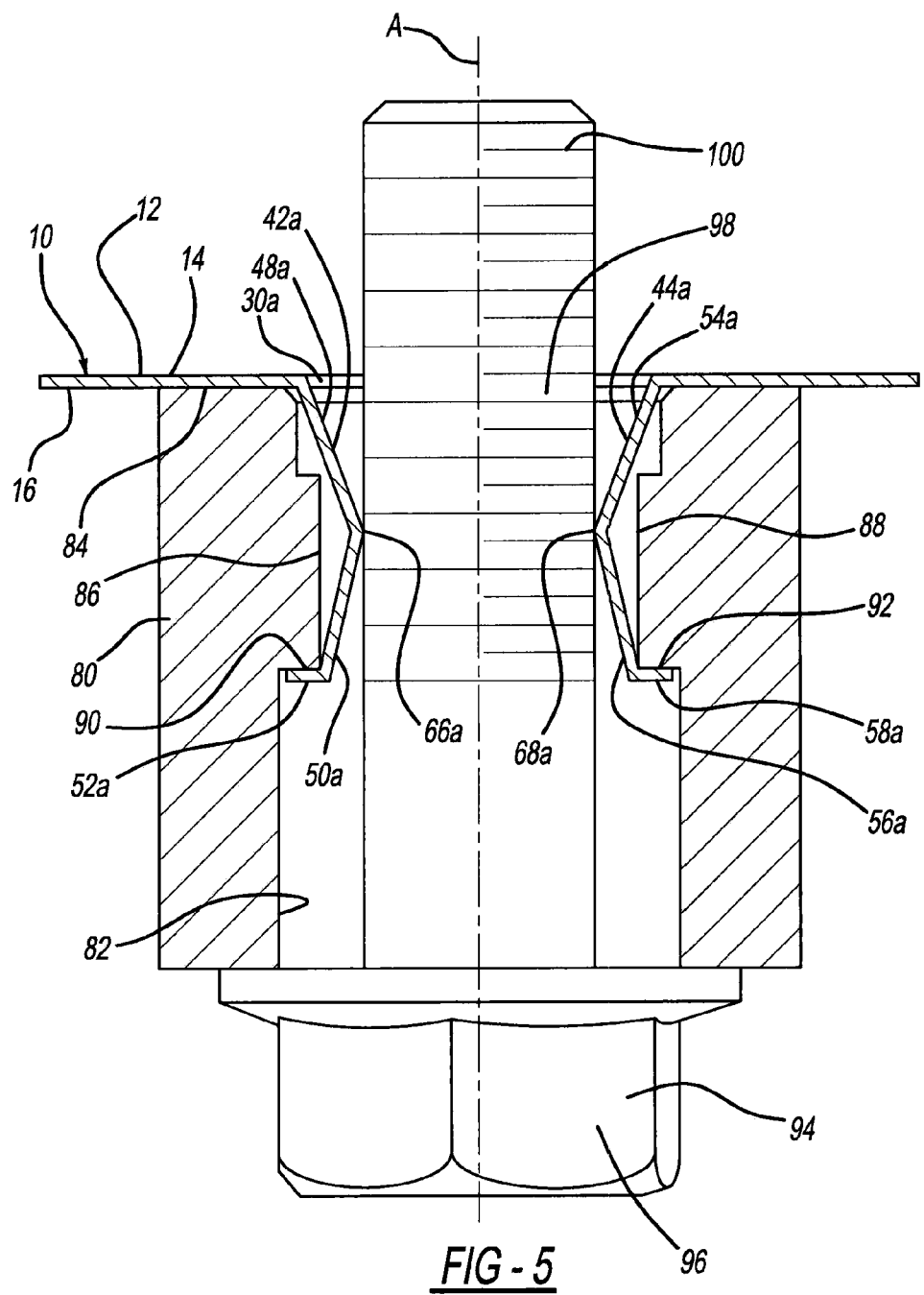
FIG. 5 is a cross-sectional view taken along line 5-5 of FIG. 4.

With additional reference to FIGS. 4 and 5, and particular reference to FIG. 5, a part is illustrated at reference numeral 80. The part 80 can be any suitable component, device, accessory, machine, or any part to which it would be desirable to couple the gasket 10 to. The part 80 defines a bore 82, which extends from an outer surface 84 of the part 80. The bore 82 defines a first flange 86 and a second flange 88 therein, each of which are proximate to the outer surface 84. The first flange 86 defines a first lip 90 at an end of the first flange 86 opposite to the outer surface 84. The second flange 88 defines a second lip 92 at an end thereof opposite to the outer surface 84.

To connect the gasket 10 to the part 80, and specifically the outer surface 84, the gasket 10 is positioned such that the second or inner surface 16 thereof is seated on the outer surface 84. The first, second, and third tabs 42a, 44a, and 46a are seated within the bore 82. As illustrated in FIG. 5, the first tab 42a is arranged in the bore 82 such that the third portion 52a thereof is seated on the first lip 90. Similarly, the second tab 44a is arranged within the bore 82 and positioned such that the third portion 58a thereof contacts the second lip 92. The third tab 46a also extends within the bore 82, and the third portion 64a thereof couples with a third flange of the bore 82 by being seated on a third lip. The third tab 46a is obscured in FIG. 3 by fastener 94, which will be further described herein.

Interaction between the first, second, and third tabs 42a, 44a, and 46a and the bore 82 will retain the gasket 10 to the part 80 at the outer surface 84. The first and second flanges 86 and 88, and the first and second lips 90 and 92 need not be present at the bore 82 in order to retain the first, second, and third tabs 42a, 44a, and 46a therein. For example, the first, second, and third tabs 42a, 44a, and 46a can be biased outward and away from the longitudinal axis A. Thus, the third portions 52a, 58a, and 64a can be biased against the inner surface 82A of the bore 82 to create a friction fit between each of the first, second, and third tabs 42a, 44a, and 46a to thereby retain the first, second, and third tabs 42a, 44a, and 46a within the bore 82. The third portions 52a, 58a, and 64a need not be included, and thus the second portions 50a, 56a, and 62a can directly contact the inner surface 82A of the bore 82 in order to retain the gasket 10 to the part 80.

The gasket 10 can also retain a suitable fastener, such as the fastener 94, within the bore 82. The fastener 94 generally includes a head 96, a shaft 98, and a threaded portion 100 of the shaft 98. The fastener 94 is arranged within the bore 82 such that the shaft 98 extends through the first aperture 30a and across the first, the second, and the third tabs 42a, 44a, and 46a. The shaft 98 is sized such that it contacts the first elbow 66a, the second elbow 68a, and the third elbow 70a. Alternatively, the first tab 42a, the second tab 44a, and the third tab 46a can be arranged about the first aperture 30a and spaced from one another such that the first, second, and third elbows 66a, 68a, and 70a contact the shaft 98 of the fastener 94 in order to couple the fastener 94 to the first, second, and third tabs 42a, 44a, and 46a, and to the gasket 10.

The gasket 10 can be coupled to the part 80 at another bore similar to the bore 82 through interaction between the first, second, and third tabs 42b, 44b, and 46b and the additional bore. The first, second, and third tabs 42b, 44b, and 46b will interact with the additional bore just as the first, second, and third tabs 42a, 44a, and 46a interact with bore 82 as described above. An additional fastener, similar to the fastener 94, can also be retained to the gasket 10 with the first, second, and third tabs 42b, 44b, and 46b.

The gasket 10 may thus be coupled to a suitable part, such as the part 80, so that the gasket 10 is in position when the part 80 is assembled to any other suitable part, such as with the fastener 94. The fastener 94 will also be in a position within the bore 82 when the part 80 is ready for assembly. The gasket 10 thus decreases assembly time and can advantageously reduce assembly costs.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A gasket comprising:
a main body defining a first aperture;
a first retention tab extending from the main body at the first aperture, a first portion of the first retention tab extending directly from the main body in a direction away from the first aperture at an acute angle as measured between an inner surface of the first portion facing the first aperture and a plane extending parallel to the main body, the first portion of the first retention tab extending at an obtuse angle as measured between the plane and an outer surface of the first portion opposite to the inner surface;
a second retention tab extending from the main body at the first aperture, a first portion of the second retention tab extending directly from the main body in a direction away from the first aperture at an acute angle as measured between an inner surface of the first portion facing the first aperture and the plane extending parallel to the main body, the first portion of the second retention tab extending at an obtuse angle as measured between the plane and an outer surface of the first portion opposite to the inner surface;
a third retention tab extending from the main body at the first aperture, a first portion of the third retention tab extending directly from the main body in a direction away from the first aperture at an acute angle as measured between an inner surface of the first portion facing the first aperture and the plane extending parallel to the main body, the first portion of the third retention tab extending at an obtuse angle as measured between the plane and an outer surface of the first portion opposite to the inner surface;
a second aperture defined by the main body;
fourth, fifth, and sixth retention tabs extending from the main body at the second aperture, the fourth, fifth, and sixth retention tabs are at least substantially similar to the first, second, and third retention tabs respectively; and
a third aperture defined by the main body between the first and second apertures.

2. The gasket of claim 1, wherein the first retention tab is opposite to a gap defined between the second retention tab and the third retention tab.

3. The gasket of claim 1, wherein each of the first retention tab, the second retention tab, and the third retention tab include a fastener retention surface at an elbow portion thereof.

4. The gasket of claim 1, wherein each of the first retention tab, the second retention tab, and the third retention tab include the first portion extending from the main body, a second portion extending directly from the first portion, and an elbow portion defined where the first and second portions meet;
wherein the second portion extends from the first portion in a direction away from the first aperture at an obtuse angle as measured between the outer surface of the first portion and an outer surface of the second portion facing away from the first aperture, and extends at a reflex angle of greater than 180° as measured between the inner surface of the first portion and an inner surface of the second portion opposite to the outer surface of the second portion.

5. The gasket of claim 4, wherein the first retention tab, the second retention tab, and the third retention tab include a third portion extending from each second portion, the third portion extends generally parallel to the plane extending parallel to the main body in an outward direction away from the first aperture.

6. The gasket of claim 5, wherein each of the first retention tab, the second retention tab, and the third retention tab extend into a cylinder having a diameter equal to a diameter of the first aperture, the cylinder being coaxial with an axis extending through the first aperture perpendicular to the plane extending parallel to the main body.

7. A gasket comprising:
a main body defining a first aperture;
a first retention tab extending from the main body at a first portion of the first aperture, a first portion of the first retention tab extending directly from the main body in a direction away from the first aperture at an acute angle as measured between an inner surface of the first portion facing the first aperture and a plane extending parallel to the main body, the first portion of the first retention tab extending at an obtuse angle as measured between the plane and an outer surface of the first portion opposite to the inner surface;
a second retention tab extending from the main body at a second portion of the first aperture opposite to the first portion, a first portion of the second retention tab extending directly from the main body in a direction away from the first aperture at an acute angle as measured between an inner surface of the first portion facing the first aperture and the plane extending parallel to the main body, the first portion of the second retention tab extending at an obtuse angle as measured between the plane and an outer surface of the first portion opposite to the inner surface; and
a third retention tab extending from the main body at the second portion of the first aperture, a first portion of the third retention tab extending directly from the main body in a direction away from the first aperture at an acute angle as measured between an inner surface of the first portion facing the first aperture and the plane extending parallel to the main body, the third retention tab is spaced apart from the second retention tab to define a gap therebetween, the first retention tab is opposite to the gap, the first portion of the third retention tab extending at an obtuse angle as measured between the plane and an outer surface of the first portion opposite to the inner surface;
a second aperture defined by the main body;
fourth, fifth, and sixth retention tabs extending from the main body at the second aperture, the fourth, fifth, and sixth retention tabs are at least substantially similar to the first, second, and third retention tabs respectively; and
a third aperture defined by the main body between the first and second apertures.

8. The gasket of claim 7, wherein the first aperture includes a first concave surface and a second concave surface both between a first side and a second side of the first aperture, the first concave surface is opposite to the second concave surface.

9. The gasket of claim 7, wherein each of the first retention tab, the second retention tab, and the third retention tab include the first portion that extends toward a line extending through a center of the first aperture and a second portion that extends away from the line; and wherein the second portion extends from the first portion in a direction away from the first aperture at an obtuse angle as measured between the outer surface of the first portion and an outer surface of the second portion facing away from the first aperture, and extends at a reflex angle of greater than 180° as measured between the inner surface of the first portion and an inner surface of the second portion opposite to the outer surface of the second portion.

10. The gasket of claim 9, wherein each of the first retention tab, the second retention tab, and the third retention tab define an elbow portion configured to contact a fastener extending through the first aperture and retain the fastener within the first aperture, the elbow portion defined wherein the first and the second portions meet.

11. The gasket of claim 7, wherein each of the first retention tab, the second retention tab, and the third retention tabs are flexible tabs.

12. A gasket comprising:
a main body defining a first aperture; and
a first retention tab, a second retention tab, and a third retention tab each extending from the main body at the first aperture and each including:
  a first portion extending from the main body in a direction away from the first aperture at an acute angle as measured between an inner surface of the first portion facing the first aperture and a plane extending parallel to the main body, and extending at an obtuse angle as measured between the plane and an outer surface of the first portion opposite to the inner surface, the first portion of the first retention tab extends towards the first portion of both the second and third retention tabs, and the first portion of the second and third retention tabs extends towards the first portion of the first retention tab;
  a second portion extending from the first portion of each of the first retention tab, the second retention tab, and the third retention tab, the second portion extends from the first portion in a direction away from the first aperture at an obtuse angle as measured between the outer surface of the first portion and an outer surface of the second portion facing away from the first aperture, and extends at a reflex angle of greater than 180° as measured between the inner surface of the first portion and an inner surface of the second portion opposite to the outer surface of the second portion; and
  an elbow portion where each first portion and second portion meet;
a second aperture defined by the main body;
fourth, fifth, and sixth retention tabs extending from the main body at the second aperture, the fourth, fifth, and sixth retention tabs are at least substantially similar to the first, second, and third retention tabs respectively; and
a third aperture defined by the main body between the first and second apertures.

13. The gasket of claim 12, wherein the first retention tab is opposite to a gap defined between the second retention tab and the third retention tab.

14. The gasket of claim 12, wherein the first retention tab is at a first side of the aperture, and both the second retention tab and the third retention tab are at a second side of the aperture that is opposite to the first side.

15. The gasket of claim 12, wherein the elbow portion of each of the first retention tab, the second retention tab, and the third retention tab is configured to retain a fastener within the first aperture.

16. The gasket of claim 1, wherein no part of the first, second and third retention tab is disposed within the first aperture.

17. The gasket of claim 7, wherein no part of the first, second and third retention tab is disposed within the first aperture.

18. The gasket of claim 12, wherein no part of the first, second and third retention tab is disposed within the first aperture.

19. The gasket of claim 12, wherein the first retention tab, the second retention tab, and the third retention tab include a third portion extending from each second portion, the third portion extends generally parallel to the plane extending parallel to the main body in an outward direction away from the first aperture.

* * * * *